July 24, 1951  D. KELLEHER  2,561,800
CLUTCH PLATE HUB
Filed May 8, 1945  2 Sheets-Sheet 1

INVENTOR.
DANIEL KELLEHER
BY
Oberlin & Limbach
ATTORNEYS

July 24, 1951  D. KELLEHER  2,561,800
CLUTCH PLATE HUB
Filed May 8, 1945  2 Sheets-Sheet 2
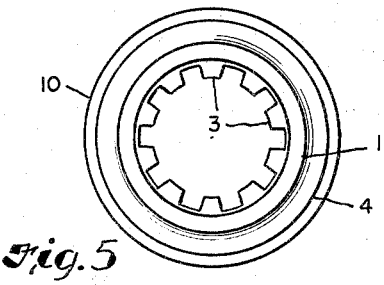
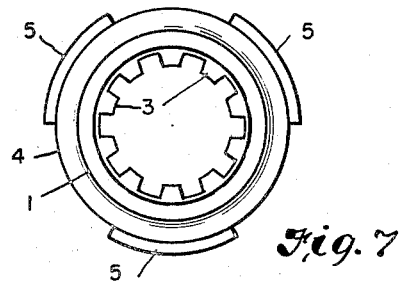
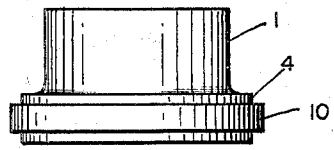
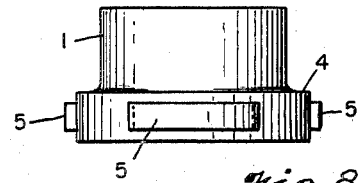
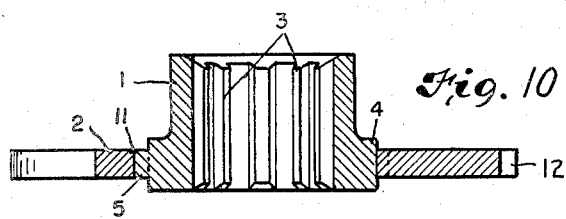
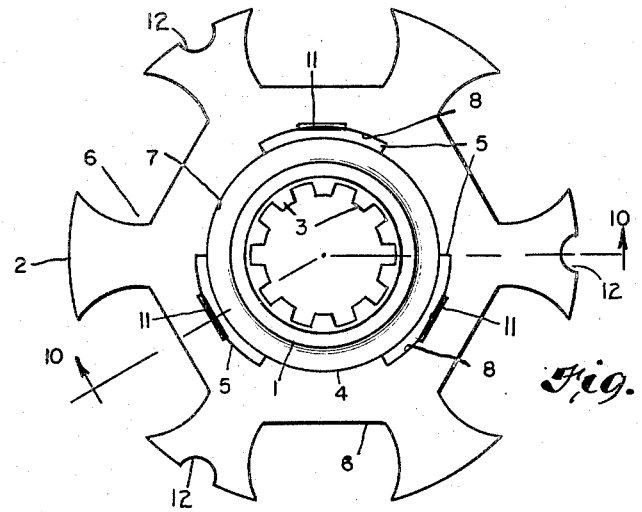
INVENTOR.
DANIEL KELLEHER
BY
Oberlin & Limbach
ATTORNEYS Patented July 24, 1951

2,561,800

UNITED STATES PATENT OFFICE 2,561,800

CLUTCH PLATE HUB

Daniel Kelleher, Berea, Ohio, assignor to
Ira Saks, Cleveland, Ohio

Application May 8, 1945, Serial No. 592,688

1 Claim. (Cl. 287—52)

The present improvements, relating as indicated to clutch plate hubs, have more particular regard to the construction of a hub for clutch plates such as are extensively employed in automotive vehicles, although the invention is not limited to such specific field of use.

In clutches of this type the hub proper is formed with a female spline adapted to fit upon the male spline of the driven shaft of the clutch assembly. The complete hub element also includes a flange carried by such hub, the extent and form of which will vary depending on the manner in which the friction disc or discs that form another essential element of the clutch are mounted on the hub element.

While it would be possible to make the hub element, including the hub proper and the flange mounted thereon, in the form of a unitary piece, such construction would obviously be impractical and accordingly, as illustrated for example in U. S. Patent No. 2,294,638 to E. V. J. Tower, dated September 1, 1942, it has heretofore been usual to form the hub proper with a polygonally shaped outer surface, e. g. six-sided or eight-sided, and then press fit thereon a stamped-out flange having a central opening of corresponding polygonal form. However, due to the very considerable circumferential stress imposed upon the connection thus provided between the hub and flange when the clutch in operation is required to pick up a heavy load, this manner of mounting the flange on the hub has led to difficulty since the polygonal faces on the hub will of course have a camming action on the opening in the flange and so tend to distort the latter and even entirely break the connection between the two parts.

One principal object of the present invention accordingly is to provide in a hub element of the general type described, i. e. comprising a hub proper and a flange mounted thereon, a superior type of connection comprising interlocking lands and recesses in place of such a polygonally shaped connection. At the same time it is rendered possible to make the hub proper from cylindrical stock instead of from polygonal stock as heretofore has been necessary. The invention further comprehends an improved form of tool on the order of a broaching tool whereby lands suitable for the purpose in question may be quickly and inexpensively formed on such a hub.

To the accomplishment of the foregoing and related ends, said invention, then, consists of the means hereinafter fully described and particularly pointed out in the claim.

The annexed drawings and the following description set forth in detail one method and one product exemplifying the invention, such disclosed procedure and product constituting, however, but one of various applications of the principle of the invention.

In said annexed drawings:

Fig. 5 is a plan view and Fig. 6 a side elevation of the hub proper, at a stage in the manufacture thereof preliminary to the operation of the foregoing apparatus thereon;

Fig. 7 is a plan view of such hub proper similar to that of Fig. 5 and Fig. 8 a side elevation thereof similar to that of Fig. 6 showing the same after such operation has been completed;

Fig. 9 is a plan view of the assembled hub element including the hub proper and flange interlocked therewith; and Fig. 10 is a sectional view of the same, the plane of the section being indicated by the line 10—10, Fig. 9.

Figure 1:
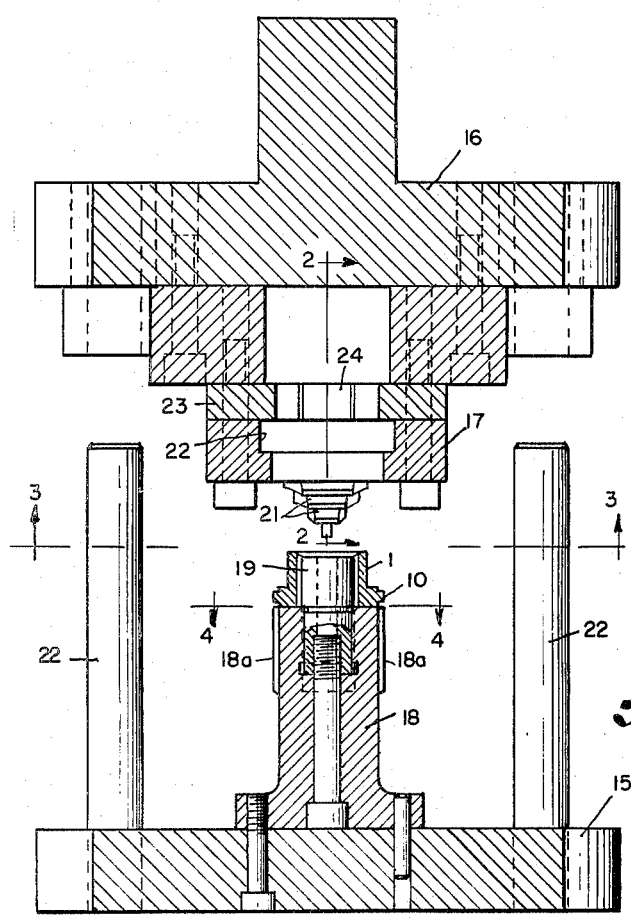
Fig. 1 is a central sectional view of an apparatus including the present improved form of broaching tool for making hubs with circumferentially spaced arcuate lands.
Figure 2:
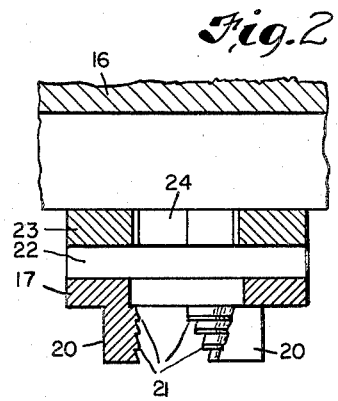
Fig. 2 is a section of a portion of such apparatus taken at right angles to the plane of Fig. 1, as indicated by the line 2—2 thereon.
Figure 3:
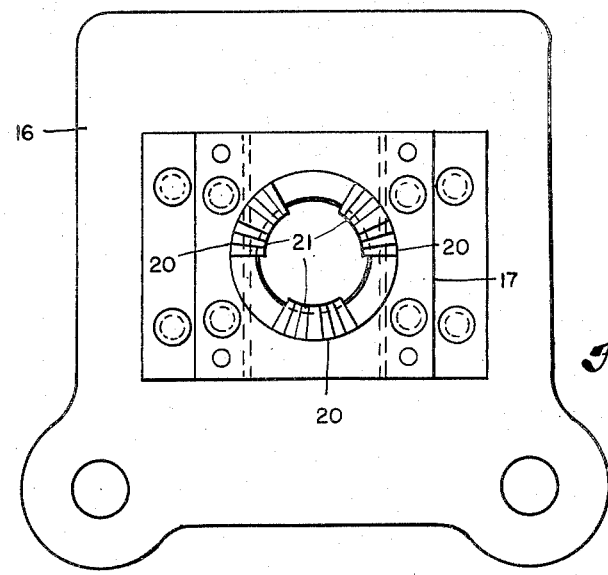
Fig. 3 is a bottom plan view of the upper portion of the apparatus as viewed from the plane indicated by the line 3—3, Fig. 1.
Figure 4:
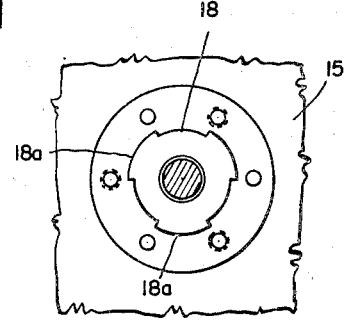
Fig. 4 is a top plan view of another portion of the apparatus.

Inasmuch as the method of making the hub proper can be best explained after describing the construction of such hub and of the hub element as a whole, the parts in question will be described first. Referring to Figs. 9 and 10, which illustrate the assembled hub element, the latter will be seen to comprise as one principal part an annular member 1 which constitutes the hub proper and a separate flange member 2 that extends radially therefrom. Member 1 is provided with a plurality of inwardly directed splines 3 which are designed to fit, as previously stated, with corresponding splines on the driven shaft to which the clutch as a whole is attached. Said member is also formed adjacent one end with a radially thickened portion 4 on which is located a series (three as shown) of circumferentially spaced arcuate lands 5. These are best shown in Figs. 7 and 8 from which it will be seen that such lands are substantially equal in extent to the intermediate recesses which separate them. The manner in which the foregoing hub proper, and particularly the arcuate flanges thereon are formed according to the present invention will be described later.

The outer portion of flange member 2 of the hub element may take on various forms depending upon the particular construction of the clutch in which such hub element is to be employed. As shown, such outer portion is intersected by a series of recesses 6 designed to receive coil spring cushions, such, for example, as are illustrated in the previously cited patent. Said flange member also has a central opening 7 of a diameter such as to closely fit the enlarged end 4 of hub member 1, such opening being further formed with a series of recesses 8 complementary to the lands 5 on said hub member. The flange will be desirably stamped from sheet metal of the proper thickness, preferably equal to the axial width of such arcuate lands 5 as shown, and exactly to the form just described, and is then ready to be assembled on the hub member by being press fitted over the enlarged end thereof with such recesses 8 in register with the lands 5. The latter, it will be seen, provide positive interlocking means between the two parts comprising the hub element, and will resist much more effectively than the polygonal type of connection heretofore employed the relative turning or twisting strains to which the hub element thus assembled is subjected when in use.

In order further to secure the flange to the hub the parts may be staked together as by striking up the bottoms of recesses 8 in the flange at points 11 into forceful engagement with the opposed lands 5; then the parts will be brazed or copper welded along the line of juncture therebetween. To facilitate proper placement of the flange on the hub circumferentially spaced notches 12 are formed in the periphery of the flange, these being so located that when brought into engagement with suitable guide pins the recesses 8 will coincide in location with lands 5 on the hub.

In the intermediate form of hub member 1 illustrated in Figs. 5 and 6, said member will be seen to be identical with the finished form just described except that its enlarged end 4 is formed with a completely encircling rib 10, it being from such rib that the lands 7 are fashioned by means of the apparatus illustrated in Figs. 1 to 4 inc. As previously indicated, the hub member in the form shown in Figs. 5 and 6 may be turned directly from cylindrical or rod stock which needs be of a diameter only slightly greater than that of such rib 10. Such turning operation may be rapidly performed on an automatic screw machine with a minimum waste of metal, while the subsequent operations of boring the central opening in the member and forming the splines 3 will be carried out in the usual manner.

The apparatus employed in forming the circumferentially spaced arcuate lands on the hub member 1 comprises essentially a bed 15 on which the work-piece, specifically the hub member in the form illustrated in Figs. 5 and 6, is suitably supported, and a reciprocable head 16 which carries a special tool 17 on the order of a broaching tool that is adapted to cut away those portions of rib 10 which correspond with the recesses between the lands 5 in the finished hub member. While being operated on, the work-piece rests on an interchangeable pedestal support 18 that rises centrally from bed 15 and is provided at its upper end with a centering stud 19 adapted to fit the bore of the workpiece so as to center the same on such support with the rib 10 projecting beyond the sides of the latter. It will be understood that different supports and studs corresponding with the different sizes of work-piece will be used.

Tool 17 comprises in effect three separate tools 20 each constituting in effect a separate broach and each will be seen to comprise a body with a concave face formed with a plurality of transverse undercut arcuate teeth 21. Furthermore, as best shown in Fig. 1, such teeth are of successively increasing transverse extent from the outer end to the base of the tool and are symmetrical with respect to a median line on the concave face of the latter. In other words, the first such tooth 21 is quite narrow, while each succeeding tooth is broader, extending an equal distance beyond the preceding one, the last such tooth being equal in extent to the recess between adjacent lands 5 on the finished work-piece. With a tool constructed as just described it has been found possible by a single operation of the press simultaneously to cut the required number of recesses to leave the complete series of lands 5 on the finished workpiece. The usual dowel or guide pins 22 are employed to retain the head 16 of the press and thus the broaching tool 17 in proper alignment with the work-piece on its support 18.

A transverse slot 22 is provided in the base of tool 17 to provide clearance space for the chips produced by the cutting action of the teeth 21. A shaving tool 23 is also desirably interposed between tool 17 and the reciprocable head 16, such shaving tool having a bore 24 that conforms exactly with the external shape which it is desired the hub should have, and so be effective when the latter is forced therethrough, following its passage through the tool, to give a smooth finished surface to the lands 5 and intermediate recesses 4 on said hub.

A convenient mode of operation will be to first force the hub in its intermediate form through the tool 17 until it passes the cutting teeth 21 and just enters the bore of cutting tool 23. Then when the next succeeding hub is forced through the cutting tool such first hub will be pushed thereby through the shaving tool. In order that the hub may be properly supported on pedestal 18 the upper portion of the latter will be preferably fluted so as to provide laterally projecting ribs 18 that correspond in shape and location with the lands 5 to be formed on the hub.

From the foregoing description it will be seen that a hub element produced which is much stronger and more resistant to the strains imposed thereon in use than has heretofore been believed possible. At the same time such improved element, and more especially the hub member proper, lends itself to a simplified and much more efficient manufacturing procedure with the further economy attendant upon the use of cylindrical or rod stock in place of polygonally formed bars. Finally, by means of the novel construction of broaching tool, the final operation in forming the circumferentially spaced lands on the hub member is rendered exceedingly simple and economical.

Other modes of applying the principle of my invention may be employed instead of the one explained, change being made as regards the product and method herein disclosed, provided the step or steps stated by the following claim or the equivalent of such stated step or steps be employed.

I therefore particularly point out and distinctly claim as my invention:

A hub element for a clutch plate comprising a hub and a plate-actuating flange mounted thereon, said hub being formed with a series of circumferentially spaced arcuate lands, the ends of which lie in radial planes through the central axis of said hub, and intermediate recesses substantially equal in extent to such lands, and said flange having a central opening formed with recesses and lands respectively complementary to the lands and recesses on said hub and having a close fit thereover, of such magnitude that said flange is rotatively interlocked with said hub without circumferential play, such arcuate lands being of axial extent at least as great as the thickness of said flange, said hub and said flange being provided with radially overlapping portions whereby said hub and flange are positively locked relative to one another in a direction longitudinal of their common axis.

DANIEL KELLEHER.

REFERENCES CITED

The following references are of record in the file of this patent:

UNITED STATES PATENTS

| Number | Name | Date |
|---|---|---|
| 679,060 | McCaffrey | July 23, 1901 |
| 899,822 | Ast | Sept. 29, 1908 |
| 1,477,266 | Jenking | Dec. 11, 1923 |
| 1,492,862 | Smith | May 6, 1924 |
| 1,565,722 | Evans | Dec. 15, 1925 |
| 1,579,359 | Hallenbeck | Apr. 6, 1926 |
| 1,601,235 | Bullard Jr. et al. | Sept. 28, 1926 |
| 1,771,349 | Puffer | July 22, 1930 |
| 1,804,878 | Jones | May 12, 1931 |
| 1,842,117 | Renshaw | Jan. 19, 1932 |
| 1,928,463 | Richardson et al. | Sept. 26, 1933 |
| 2,070,892 | Gamble | Feb. 16, 1937 |
| 2,197,039 | Gottlieb | Apr. 16, 1940 |
| 2,294,638 | Tower | Sept. 1, 1942 |